Patented Sept. 19, 1950

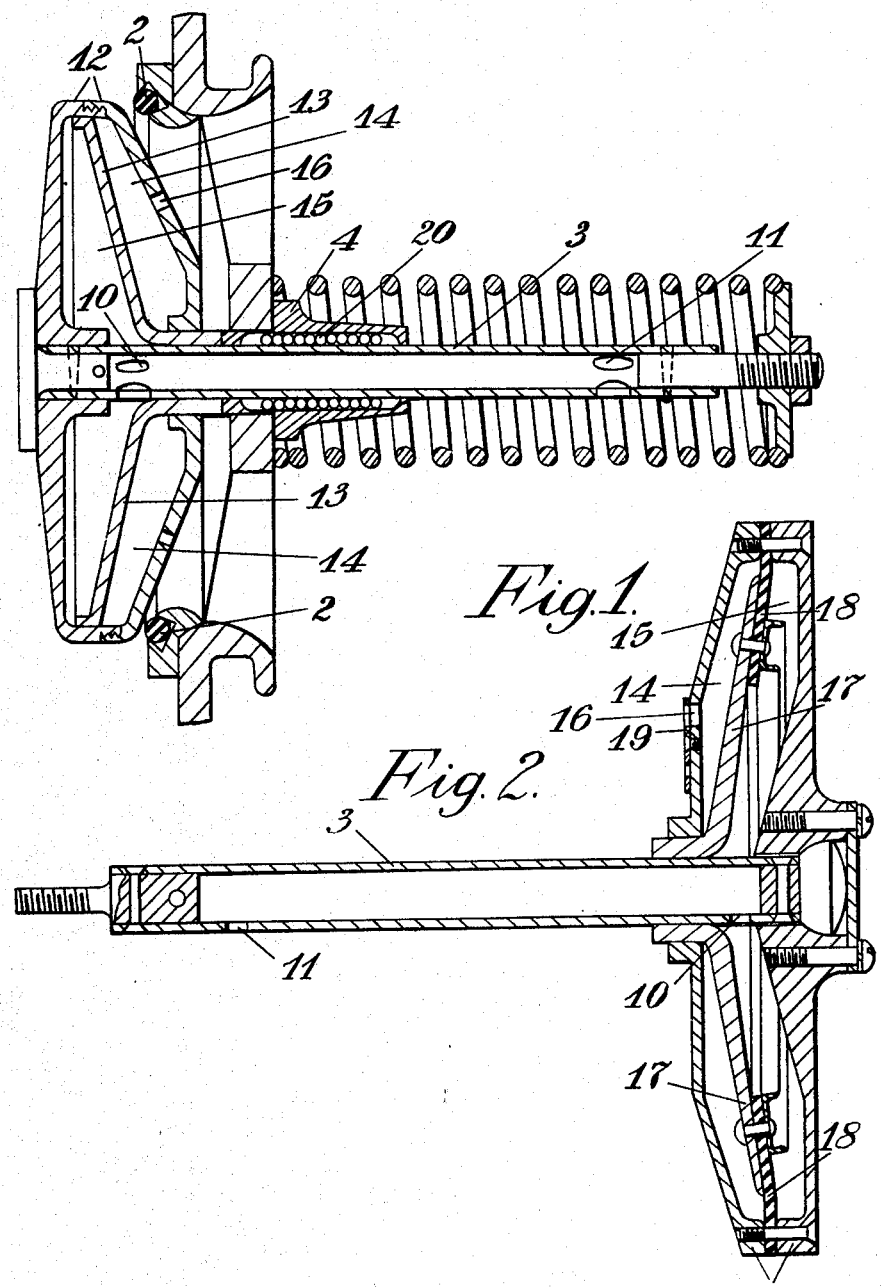

2,523,036

UNITED STATES PATENT OFFICE 2,523,036

PRESSURE RELEASE VALVE

Angus Charles Marjoribanks Maitland and Eric Dudley Bannister, Yeovil, England, assignors to Westland Aircraft Limited, Yeovil, England Application April 9, 1946, Serial No. 660,736
In Great Britain November 10, 1944

3 Claims. (Cl. 98—1.5)

This invention relates to pressure release valves and is more particularly, though not exclusively, intended for release of air from an aircraft pressure cabin when a predetermined differential pressure is exceeded.

When a release valve opens to relieve pressure from a contained space, a reduction of load on the surface of the valve takes place owing to a drop of pressure near the valve seating caused by the velocity of the air passing out of the annulus and the valve therefore tends to close. If flow is maintained through the contained space a general rise in pressure must take place to keep the valve open and yet compensate for the locally reduced pressure on the valve head as described.

The main object of the present invention is to provide improved forms of pressure release valves wherein the aforesaid rise of pressure upon flow taking place may be reduced, eliminated or even reversed.

The invention consists in a pressure release valve having features as set out in the claims appended hereto.

Referring to the accompanying diagrammatic drawings—

Figure 1 is a vertical sectional view of an aircraft cabin pressure relieving valve embodying the present invention.

Figure 2 is a similar view of a modified form thereof, and

Figure 3:
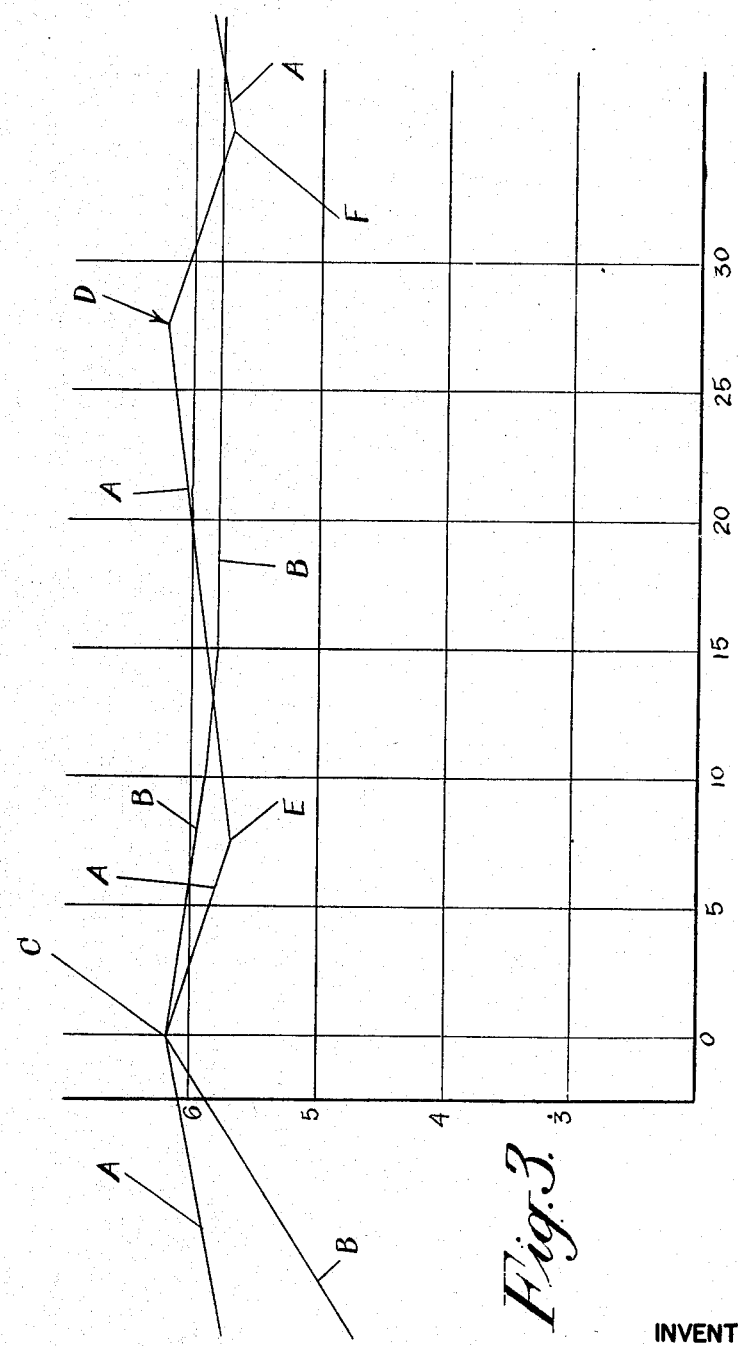
Figure 3 illustrates graphs representing the performance of the valve shown in Figure 2.

In carrying the invention into effect according to one form illustrated by way of example in Figure 1 as applied to a valve for automatically relieving the pressure of an aircraft pressure cabin when the differential pressure exceeds a predetermined figure, we provide a hollow valve head 12 and mount within the hollow a fixed piston-like member 13 serving to divide the hollow into two spaces 14, 15. The space 14 is in constant communication, by means of one or more holes 16 in the inner face of the valve head 12, with the space adjacent to the valve seating 2 whilst the other space 15 is in communication by way of holes 10 and 11 at both ends of the hollow valve spindle 3 with static pressure within the cabin.

The air within the latter space exerts a uniform pressure in the space 15 between the piston-like member and the outer surface of the valve head 12 whilst the hole or holes 16 in the inner surface of the valve head ensure that there is no pressure drop across that surface of the valve head.

When the valve opens, the pressure drop in the locality of the holes 16 causes a pressure drop in the space 14, which results in an additional opening force on the valve.

The valve spindle 3 is mounted within its guide 4 upon axially operative ball bearings 20 in order to reduce friction.

The valve operates with a substantially uniform pressure derived from the cabin under all conditions up to the maximum flow for which the valve is intended to deal.

According to a further modified arrangement illustrated in Figure 2, in which a practically uniform pressure may be maintained within the cabin irrespective of the degree of opening of the valve, we provide a hollow valve head 12 as in the previous example, together with a fixed internal piston-like member 17, but in this case instead of forming the latter as a true piston, we connect it to the valve head by a flexible diaphragm 18 to cause positive seal while allowing for axial movement.

In this example the hole or holes 16 in the inner face of the valve head are partially covered by adjustment plates 19. When the valve is closed, the inner space 14 within the hollow valve head is in communication with the cabin air adjacent to the valve seating by way of the hole or holes 16 and there is thus no load across the inner face of the valve head, but when the valve opens the pressure drop in the locality of the holes causes a pressure drop in the aforesaid space which results in a load on the valve head, which load can be varied to suit requirements by varying the number, size and position of the holes. This additional load overcomes friction, spring rate, etc., and cancels out any remaining back pressure due to these causes.

It is preferred that the valve spindle be mounted within its guide upon axially operative ball bearings both in this modification and in other modifications of the present invention in order to reduce friction.

The performance of this valve is illustrated in Figure 3 in which pressure in pounds per square inch are plotted as ordinates and time in seconds as abscissa.

Graph A represents the performance when the rate of flow of air into and out of a space in the wall of which the valve of Figure 2 is fitted, is 400 cu. ft. per minute whilst graph B represents the performance when the flow is increased to 600 cu. ft. per minute.

The valve on curve A opens sharply at points C and D and the pressure in the space falls whilst the valve closes sharply at the points E and F.

The valve on curve B closes sharply at the point C and subsequently remains open. In other words, the pressure falls as soon as the valve opens and then according to the rate of delivery flow either remains constant at a value such that outflow equals inflow, or rises to the value at which the valve will re-open.

We claim:

1. A pressure release valve comprising a seat, a hollow spindle, a hollow head rigid thereon, a fixed guide member for said spindle, a fixed member in said head having a passage therethrough for slidably receiving said spindle serving to divide the space therein into two compartments, communicating means including ports in said spindle on one side of said fixed member between one of said compartments and the static pressure to be released, communicating means including ports in said hollow head on the other side of said fixed member between the other compartment and a point adjacent to the valve seat, and means urging said valve into closed position.

2. A pressure release valve as claimed in claim 1 wherein the valve spindle is carried in axially operative ball bearings in a fixed guide.

3. A pressure release valve as claimed in claim 1 wherein spring means are employed for urging said valve into said closed position.

ANGUS CHARLES
    MAJORIBANKS MAITLAND.
ERIC DUDLEY BANNISTER.

REFERENCES CITED

The following references are of record in the file of this patent:

UNITED STATES PATENTS

| Number | Name | Date |
|---|---|---|
| 95,382 | Rochow | Sept. 23, 1869 |
| 846,059 | Schmid | Mar. 5, 1907 |
| 2,413,027 | Maxson | Dec. 24, 1946 |
| 2,466,779 | Pevney | Apr. 12, 1949 |

FOREIGN PATENTS

| Number | Country | Date |
|---|---|---|
| 19,702 | Great Britain | Sept. 3, 1907 |
| 442,217 | Germany | Mar. 28, 1927 |